(12) United States Patent
Vanderhoof

(10) Patent No.: US 11,697,196 B1
(45) Date of Patent: Jul. 11, 2023

(54) INFLATION CHANGING TOOL

(71) Applicant: Layne D. Vanderhoof, Garland, UT (US)

(72) Inventor: Layne D. Vanderhoof, Garland, UT (US)

( * ) Notice: Subject to any disclaimer, the term of this patent is extended or adjusted under 35 U.S.C. 154(b) by 0 days.

(21) Appl. No.: 17/495,003

(22) Filed: Oct. 6, 2021

(51) Int. Cl.
*B25B 27/02* (2006.01)
*A01J 7/00* (2006.01)

(52) U.S. Cl.
CPC ............. *B25B 27/023* (2013.01); *A01J 7/00* (2013.01)

(58) Field of Classification Search
CPC ......... B25B 27/023; B25B 5/00; B25B 5/067; B25B 5/082; B25B 5/101; A01J 7/00; B25F 1/00; B25F 1/003
USPC ....... 29/257; 7/119, 138, 170; 269/143, 249, 269/238–239, 246; 119/14.01
See application file for complete search history.

(56) References Cited

U.S. PATENT DOCUMENTS

| | | | | |
|---|---|---|---|---|
| 514,614 A * | 2/1894 | Brintnall | ................... | B25B 1/12 269/239 |
| 961,983 A * | 6/1910 | Morse | ..................... | B25B 1/103 269/146 |
| 1,176,019 A * | 3/1916 | Baker | ..................... | B25B 1/103 126/92 B |
| 2,228,593 A * | 1/1941 | Dibble | ..................... | B60R 9/02 224/42.31 |
| 2,990,738 A * | 7/1961 | Zysset | ................... | B25B 1/2405 269/97 |
| 3,982,739 A * | 9/1976 | Maes | ..................... | B25B 5/147 269/271 |
| 4,228,763 A | 10/1980 | Heidecker et al. | | |
| 4,324,201 A | 4/1982 | Larson | | |
| 4,583,724 A * | 4/1986 | Huang | ................... | B25B 1/2405 269/283 |
| 4,592,541 A * | 6/1986 | Huray | ..................... | B25B 5/003 269/155 |
| 5,163,665 A * | 11/1992 | Klearman | ............. | B25B 1/2452 294/902 |
| 5,350,163 A * | 9/1994 | Lichtenberg | ............ | B25B 5/163 269/902 |
| 5,572,947 A | 11/1996 | Larson et al. | | |
| 6,990,923 B2 | 1/2006 | Hein et al. | | |
| 7,159,496 B2 * | 1/2007 | Maes | ..................... | B23D 47/06 269/45 |

FOREIGN PATENT DOCUMENTS

DE 19710815 A1 * 9/1998 ............... B25B 1/08

OTHER PUBLICATIONS

How to change a milking inflation (aka liner). Video [online]. YouTube.com [published by Paul Hamby on Sep. 26, 2013; retrieved on Feb. 10, 2021]. Retrieved from the Internet: <URL: https://www.youtube.com/watch?v=MqRKSDkC55E>.

(Continued)

*Primary Examiner* — Don M Anderson
*Assistant Examiner* — Jason Khalil Hawkins
(74) *Attorney, Agent, or Firm* — Cramer Patent & Design, PLLC; Aaron R. Cramer

(57) ABSTRACT

An Inflation Changing Tool is a tool having a C-clamp, handle, punch, angle iron, stopper and duckbill. The tool is configured to facilitate the removal and replacement of a milk inflator.

8 Claims, 6 Drawing Sheets

(56) References Cited

OTHER PUBLICATIONS

12" Cow Cattle Milk Milking Milker Partial Machine Cup Shell w/ Inflation Liner. Product Listing [online]. Copyright © 1995-2021 eBay Inc. [published on Sep. 26, 2013; retrieved on Oct. 4, 2010]. Retrieved from the Internet: <URL: https://www.ebay.com/itm/144162928702?hash=item2190c7b83e:g:OsEAAOSwfQdhH1wJ>.
How to Replace Surge Milker Inflation Liners. Video [online]. YouTube.com [published by Mommymilestones on Mar. 12, 2015; retrieved on Feb. 10, 2021]. Retrieved from the Internet: <URL: https://www.youtube.com/watch?v=Y2FLH5NdBEU>.

\* cited by examiner

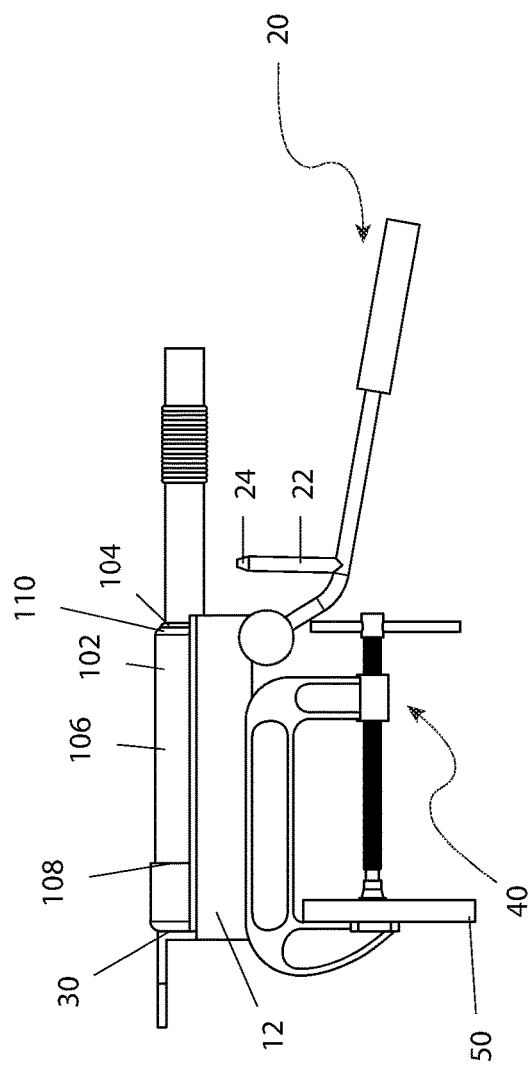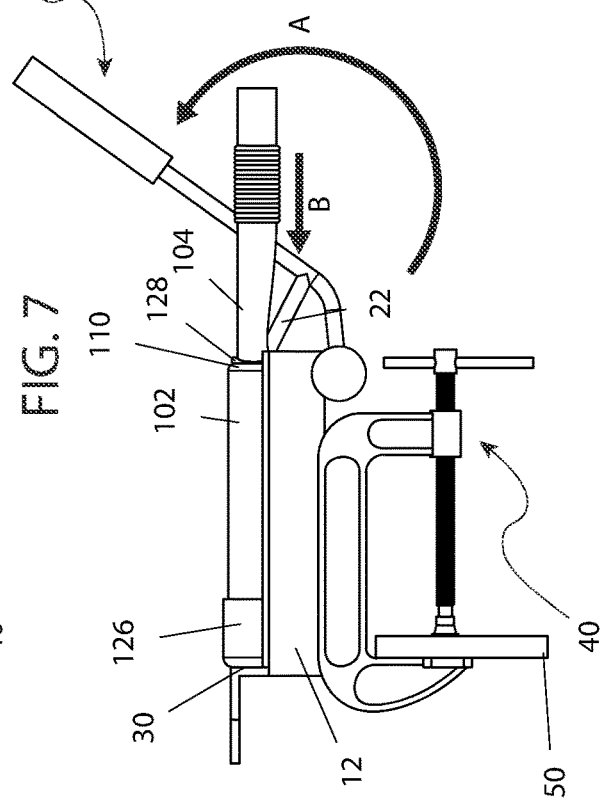

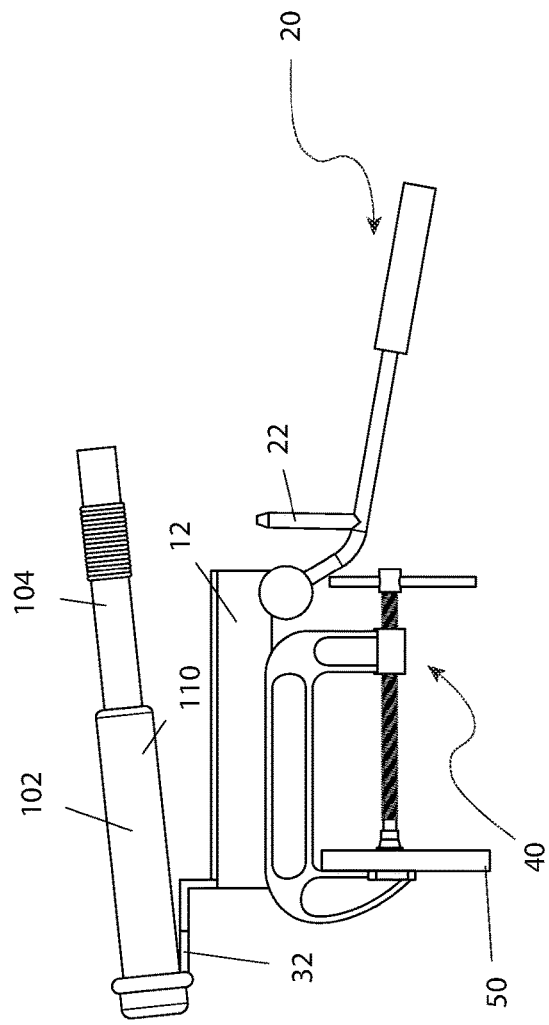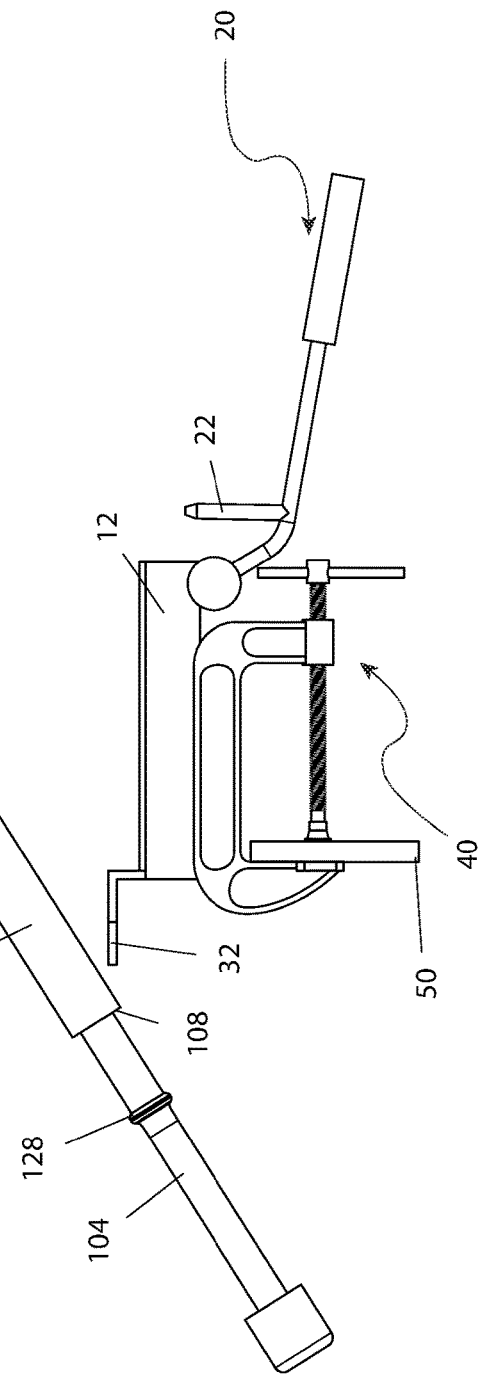

INFLATION CHANGING TOOL

RELATED APPLICATIONS

None.

FIELD OF THE INVENTION

The present invention relates generally to an inflation changing tool for milking machines.

BACKGROUND OF THE INVENTION

As anyone who performs a lot of physical work will attest, nothing beats having the proper tool for a job. The proper tool can save time, save money, produce a higher quality job, reduces damage to equipment, and provides for the increased safety of the worker. Each field of skilled trades work has its own type of specialty tools, each performing a specialized task. One specific area where there has been a need for such a specialized tool is that in the dairy farming industry when inflators are replaced on milking machines. These inflators, made of rubber, must be replaced after two-thousand (2,000) uses.

Typically, these inflators must be removed using brute force on the part of the farmer. This not only takes time, but quickly tires out the worker. Also, the risk of physical injury due to slippage is great to not only the worker, but the equipment as well. Accordingly, there exists a need for a means by which inflators used on milking machines can be easily and quickly removed to address the issues described above. The development of the Inflation Changing Tool fulfills this need.

SUMMARY OF THE INVENTION

To achieve the above and other objectives, the present invention provides for an inflation liner removal tool has a base which extends between a first tool end and a second tool end, a first tool end which includes a lever assembly which has a linear rod with a first end rotatably attached to the base at the first tool end, a grip circumferentially which is attached to a second end of the rod, a second tool end having a wall which is configured as a stop for the cup such that movement of the ever assembly into engagement with the liner prevents the cup from moving off the base, a clamp assembly which includes a clamp body bridging between a clamp first end and a clamp second end, an aperture which passes through a clamp first end and is parallel with the clamp body, a shaft linearly displaced relative to the clamp first end by travelling through the aperture, and an abutment which is disposed on the second end of the shaft and a shaft adjuster located on a first end of the shaft. The base is configured for placement of a cup with a liner of a milking machine inserted therein. The lever assembly is configured for rotation relative to the base. The clamp assembly is included with the base.

The locking flange may be circumferentially disposed about an elongated body of the liner of a milking machine. The lever assembly may include a protrusion attached to the linear rod adjacent to the first tool end. The base may include a substantially "V"-shape. The base may include a shape selected from the group consisting of an oval shape, an oblong shape, a triangular shape, a rectangular shape, a square shape, a polygonal shape, an irregular shape, a uniform shape, a non-uniform shape, a variable shape, or a tapered shape to facilitate placement of the cup with the liner of a milking machine. The protrusion may include an engagement surface. The protrusion may extend inwards such that rotation of the lever assembly causes the engagement surface to engage the locking flange of the liner to push the locking flange into an opening. The wall may include a planar projection that extends outwards and is configured to engage the head to disengage the head from the cup.

The projection may be concave to allow for a flush engagement with the tubular body of the cup as the projection translates along the cup to disengage the head for a smooth translation of the projection into engagement with the head. The clamp assembly may be configured to fix the inflation liner removal tool to a stable support structure. The clamp assembly may include a connection between the inflation liner removal tool and a fixture. The connection may be via a friction fit, a pressure fit, a mating engagement, a dovetail connection, a tongue in groove connection, or a key and key slot.

The clamp assembly may be a C-clamp. The abutment may be an extended portion of the second end of the shaft and has an outer surface facing an inner surface of the clamp second end such that a support structure is fixedly secured to the clamp assembly upon placement of the support structure between the abutment and the clamp second end where placement of the abutment is operably controlled by the shaft adjuster. The shaft adjuster may operably control displacement of the shaft.

BRIEF DESCRIPTION OF THE DRAWINGS

These and other features, aspects, and advantages of the present disclosure will become better understood with regard to the following description, appended claims, and accompanying drawings where:

FIG. 7 is a perspective view of the tool in use, according to an embodiment of this disclosure;

FIG. 8 is another perspective view of the tool in use, according to an embodiment of this disclosure;

FIG. 9 is yet another perspective view of the tool in use, according to an embodiment of this disclosure; and FIG. 10 is still yet another perspective view of the tool in use, according to an embodiment of this disclosure.

Figure 1:
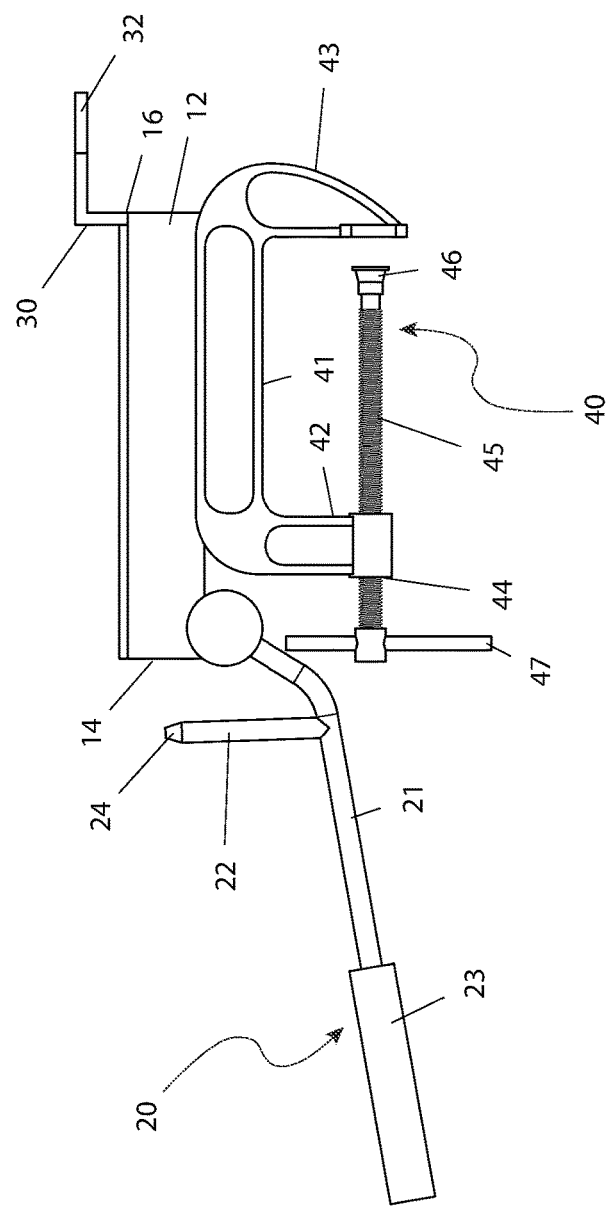
FIG. 1 is a side view of an inflation liner removal tool, according to an embodiment of this disclosure.
Figure 2:
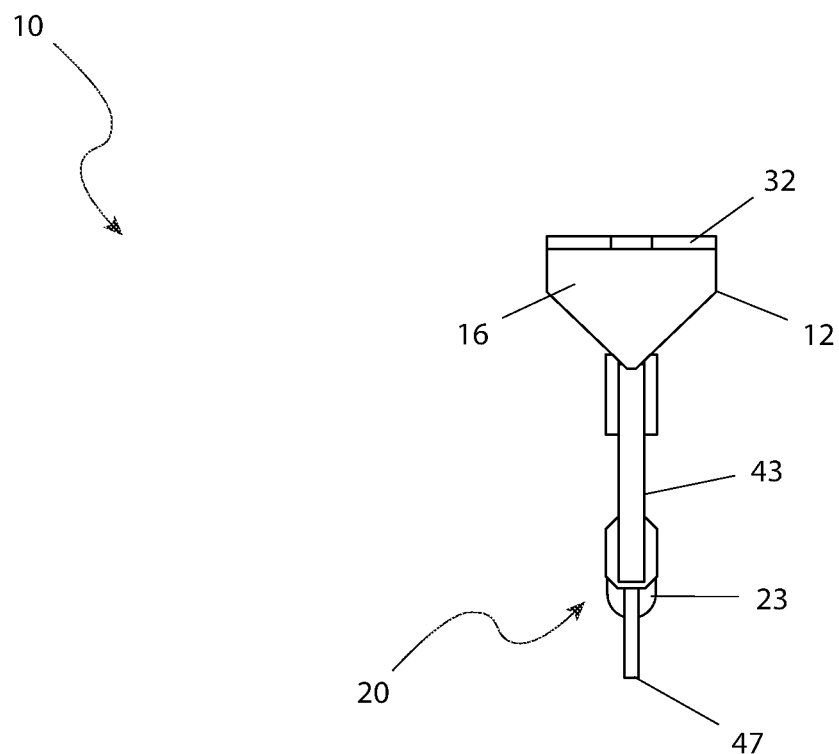
FIG. 2 is a rear view of the tool, according to an embodiment of this disclosure.

| DESCRIPTIVE KEY | |
|---|---|
| A | arrow A |
| B | arrow B |
| 10 | inflation liner removal tool |
| 12 | base |
| 14 | first tool end |
| 16 | second tool end |
| 20 | lever assembly |
| 21 | rod |
| 23 | grip |
| 22 | protrusion |

-continued

| DESCRIPTIVE KEY | |
|---|---|
| 24 | engagement surface |
| 30 | wall |
| 32 | projection |
| 40 | clamp assembly |
| 41 | clamp body |
| 42 | clamp first end |
| 43 | clamp second end |
| 44 | aperture |
| 45 | shaft |
| 46 | abutment |
| 47 | shaft adjuster |
| 50 | support structure |
| 102 | milking cup |
| 104 | inflation liner |
| 106 | tubular body |
| 108 | first opening |
| 110 | second opening |
| 112 | surface |
| 120 | body |
| 122 | first liner end |
| 124 | second liner end |
| 126 | head |
| 128 | flange |

DETAILED DESCRIPTION

The following disclosure is provided to describe various embodiments of a tool 10 configured for use to change a milking inflation liner 104. Changing inflation liners 104 is a process of taking the old rubber inflation liner 104 out of the milking unit, for example, a milking cup 102, for replacement with a new liner 104. The liners 104 need to be changed every two thousand (2000) milkings. Typically, changing the inflation liner 104 requires the user to push a nub of the inflation liner 104 through a second opening 110 of the milking cup 102. This requires the user to have a required strength to apply the needed force to push the nub through the second opening 110 of the milking cup 102. Some users may not have the strength needed to push the nub through the second opening 110 and a tool 10 is provided that will provide an efficient and easily repeatable way to remove the liner 104.

Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way. Referring now to FIGS. 1-10, an illustrative inflation liner changing tool 10 will now be discussed in more detail.

A milking machine includes, in part, a metal milking cup 102 and a rubber liner 104. The milking machine is configured for connection with a teat of a cow to transfer milk to the milking machine. Cup 102 includes a tubular body 106 having a first opening 108 at a first end and a second opening 110 at a second end. Rubber liner 104 includes an elongated body 120 that extends between a first liner end 122 and a second liner end 124. First liner end 122 includes a head 126 configured for connection about a surface 112 of the first opening 108. Head 126 fits about surface 112. Head 126 engages surface 112 via a friction fit, pressure fit or mating engagement to releasably fix liner 104 with cup 102. First liner end 122 is configured for attachment with a teat of a cow and second liner end 124 is configured for connection with a portion of the milking machine.

A locking flange 128 is disposed between first liner end 122 and second liner end 124. Flange 128 is circumferentially disposed about body 120. Flange 128 is configured to releasably fix liner 104 with cup 102. To connect liner 104 with cup 102, second liner end 124 is translated through cup 102 and flange 128 is compressed and pulled though second opening 110. As flange 128 passes through second opening 10, flange 128 expands to resist and/or prevent movement of liner 104 relative to cup 102 during use.

Figure 3:
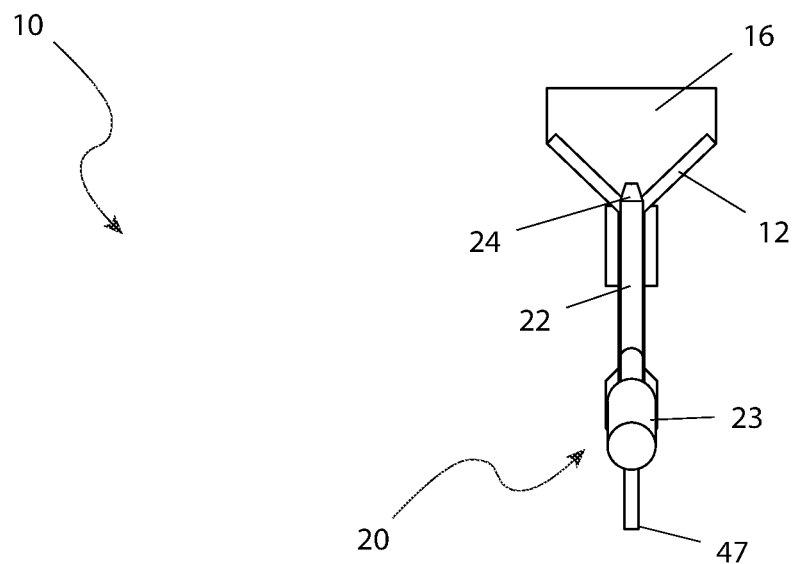
FIG. 3 is a front view of the tool, according to an embodiment of this disclosure.
Figure 4:
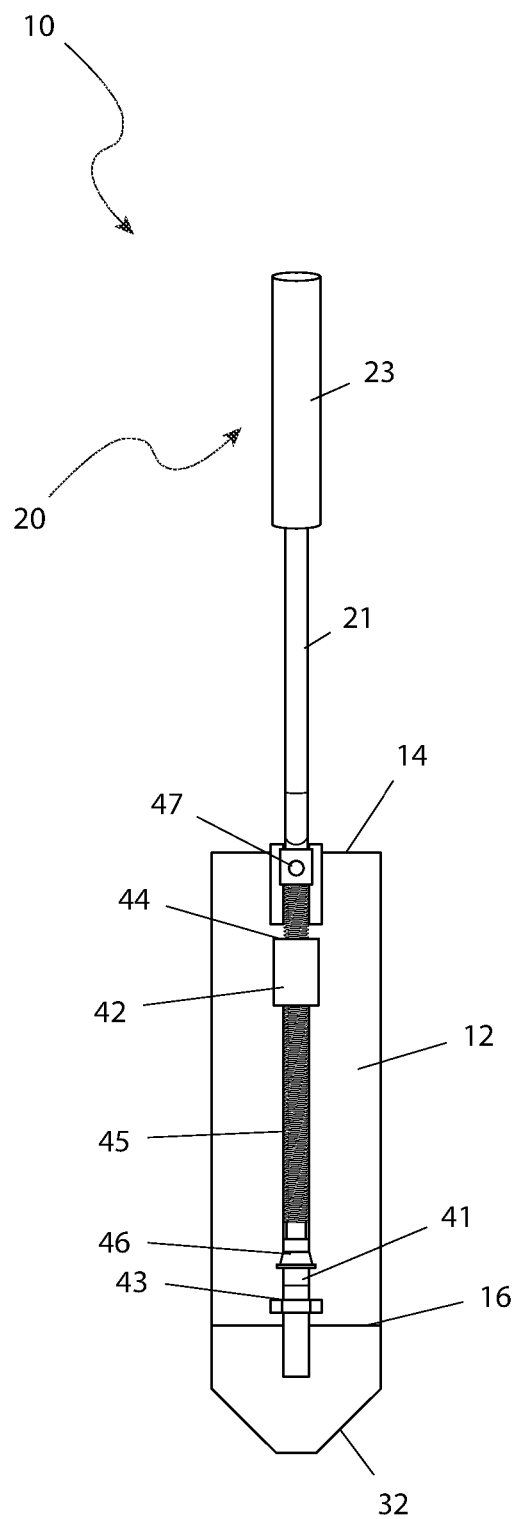
FIG. 4 is a top view of the tool, according to an embodiment of this disclosure.
Figure 5:
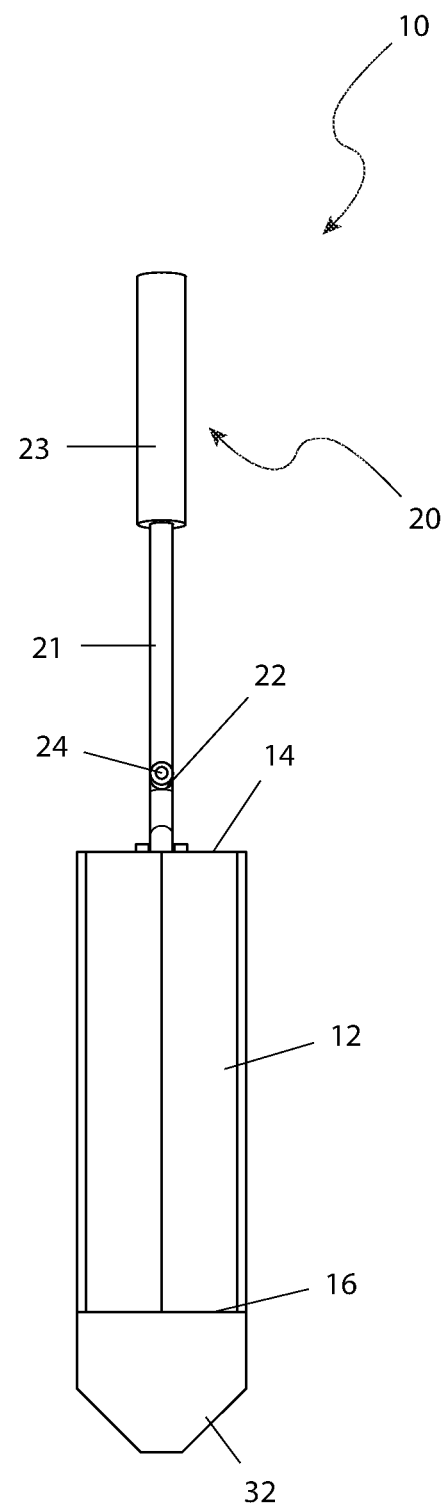
FIG. 5 is a bottom view of the tool, according to an embodiment of this disclosure.
Figure 6:
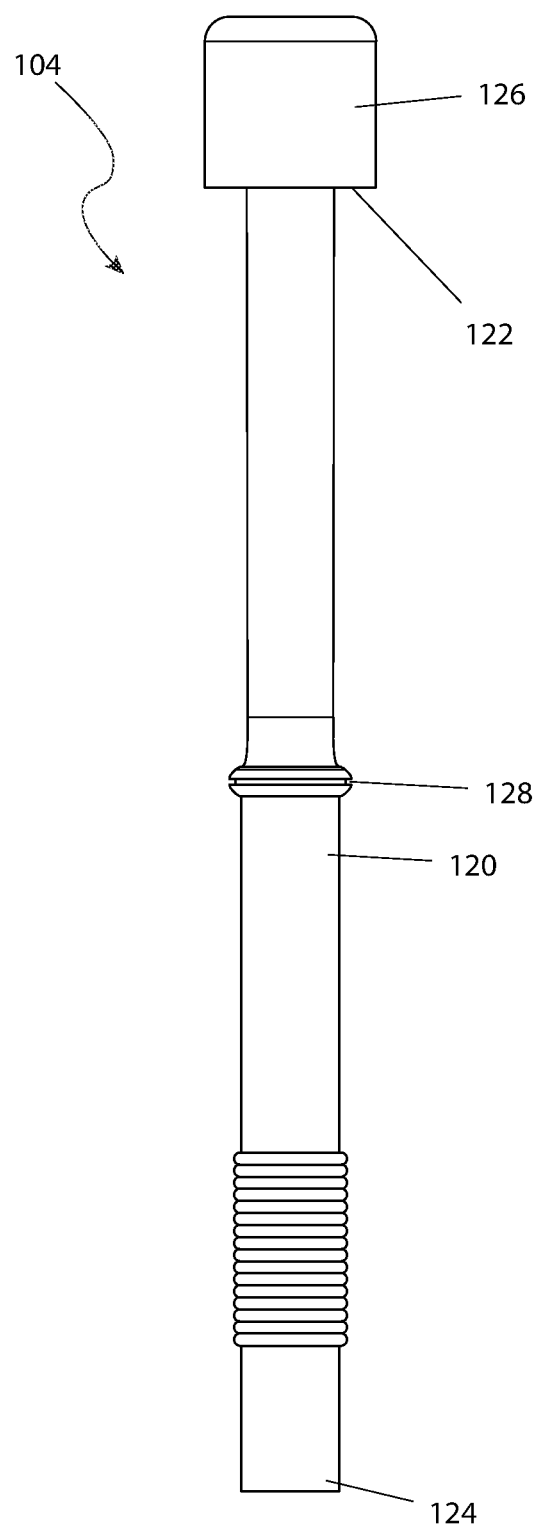
FIG. 6 is a side view of an inflation liner, according to an embodiment of this disclosure.

Tool 10 includes a base 12 extending between a first tool end 14 and a second tool end 16. Base 12 includes a substantially "V"-shape, as shown in FIG. 3. Base 12 is configured for placement of cup 102 with liner 104 inserted therein. In some embodiments, base 12 may include various shapes: for example, oval, oblong, triangular, rectangular, square, polygonal, irregular, uniform, non-uniform, variable, and/or tapered to facilitate placement of cup 102.

First tool end 14 includes a lever assembly 20 which includes a linear rod 21 having a first end rotatably attached to the base 12 at the first tool end 14. A grip 23 is circumferentially attached to a second end of the rod 21. Lever assembly 20 is configured for rotation relative to base 12. Lever assembly 20 includes a protrusion 22 attached to the rod 21 adjacent the first tool end 14. Protrusion 22 includes an engagement surface 24. Protrusion 22 extends inwards such that rotation of lever assembly 20 causes engagement surface 24 to engage flange 128 of liner 104 to push flange 128 into second opening 110, as described herein.

Second tool end 16 includes a wall 30. Wall 30 is configured as a stop for cup 102 such that movement of lever assembly 20 into engagement with liner 102 prevents cup 102 from moving off base 12. Wall 30 includes a planar projection 32. Projection 32 extends outwards and is configured to engage head 126 to disengage head 126 from cup 102, as described herein. In some embodiments, projection 32 is concave to allow for a flush engagement with the tubular body 106 of cup 102 as projection translates along cup 102 to disengage head 126. This provides for a smooth translation of projection 32 into engagement with head 126.

Base 12 includes a clamp assembly 40. An exemplary embodiment of the clamp assembly 40 is a C-clamp. Such a clamp assembly 50 can include a clamp body 41 bridging between a clamp first end 42 and a clamp second end 43 at distal ends of the "C"-shape. An aperture 44 passes through the clamp body first end 42 and is parallel with the clamp body 41. A shaft 45 is linearly displaceable relative to the clamp first end 42 by travelling through the aperture 44. Located on a first end of the shaft 45 is a shaft adjuster 47 and disposed on the second end of the shaft 45 is an abutment 46. Shaft adjuster 47 operably controls the displacement of the shaft 45. Abutment 46 is an extended portion of the second end of the shaft 45 and has an outer surface facing an inner surface of the clamp second end 43 such that a support structure 50 can be fixedly secured to the clamp assembly 40 upon placement of the support structure 50 between the abutment 46 and the clamp second end 46, where the placement of abutment 46 is operably controlled by the shaft adjuster 47. Clamp assembly 40 is configured to fix tool 10 to a stable support structure 50, for example, a garbage pail to facilitate stabilizing tool 10 and discarding liner 104. In some embodiments, the clamp assembly 40 may include an integral connection between tool 10 and a fixture, or connected via a friction fit, pressure fit, mating engagement, dovetail connection, tongue in groove, and/or key/keyslot.

In operation, a user secures tool 10 to a support structure 50, for example, a fifty-five-gallon barrel, as shown in FIGS. 7-10. Cup 102 with liner 104 attached thereto is placed on base 12, as shown in FIG. 7. Second liner end 124 of liner 104 is positioned towards lever assembly 20. Lever assembly 20 is rotated in a direction shown by arrow A in FIG. 8. Rotation of lever assembly 20 causes engagement surface 24 to apply a force, in the direction shown by arrow B in FIG. 8. The force applied to flange 128 causes flange 128 to be pressed into second opening 110. This allows for liner 104 to be provisionally released from cup 102. Cup 102, with liner 104 still attached, is positioned next to projection 32 such that projection 32 abuts head 126. Projection 32 translates along cup 102 to engage head 126 and pry head 126 from surface 112. Liner 104 is removed from cup 102 and discarded.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

What is claimed is:

1. An inflation liner removal tool, comprising:
   a base extending between a first tool end and a second tool end, the base is configured for placement of a cup with a liner of a milking machine inserted therein;
   a first tool end including a lever assembly having a linear rod with a first end rotatably attached to the base at the first tool end, the lever assembly is configured for rotation relative to the base;
   a grip circumferentially attached to a second end of the rod;
   a second tool end having a wall configured as a stop for the cup such that movement of the lever assembly into engagement with the liner prevents the cup from moving off the base;
   a clamp assembly including a clamp body bridging between a clamp first end and a clamp second end, the clamp assembly is included with the base;
   an aperture passing through a clamp first end and is parallel with the clamp body;
   a shaft linearly displaced relative to the clamp first end by travelling through the aperture; and
   an abutment disposed on the second end of the shaft and a shaft adjuster located on a first end of the shaft;
   wherein a locking flange is circumferentially disposed about an elongated body of the liner of the milking machine;
   wherein the lever assembly includes a protrusion attached to the linear rod adjacent to the first tool end;
   wherein the base includes a shape selected from the group consisting of an oval shape, an oblong shape, a triangular shape, a rectangular shape, a square shape, a polygonal shape, an irregular shape, a uniform shape, a non-uniform shape, a variable shape, or a tapered shape to facilitate placement of the cup with the liner of the milking machine;
   wherein the protrusion includes an engagement surface; and
   wherein the base includes a substantially "V"-shape.

2. The inflation liner removal tool, according to claim 1, wherein the protrusion extends inwards such that rotation of the lever assembly causes the engagement surface to engage the locking flange of the liner to push the locking flange into an opening.

3. The inflation liner removal tool, according to claim 1, wherein the wall includes a planar projection that extends outwards and is configured to engage a head to disengage said head from the cup.

4. The inflation liner removal tool, according to claim 3, wherein the projection is concave to allow for a flush engagement with the tubular body of the cup as the projection translates along the cup to disengage the head for a smooth translation of the projection into engagement with the head.

5. The inflation liner removal tool, according to claim 1, wherein the clamp assembly is configured to fix the inflation liner removal tool to a stable support structure.

6. The inflation liner removal tool, according to claim 1, wherein the clamp assembly is a C-clamp.

7. The inflation liner removal tool, according to claim 1, wherein the abutment is an extended portion of the second end of the shaft and has an outer surface facing an inner surface of the clamp second end such that a support structure is fixedly secured to the clamp assembly upon placement of the support structure between the abutment and the clamp second end where placement of the abutment is operably controlled by the shaft adjuster.

8. The inflation liner removal tool, according to claim 1, wherein the shaft adjuster operably controls displacement of the shaft.

* * * * *